(12) United States Patent
Edlund

(10) Patent No.: US 10,438,482 B2
(45) Date of Patent: Oct. 8, 2019

(54) METHOD AND SYSTEM FOR REMOTELY DETECTING A VEHICLE

(71) Applicant: TAGMASTER AB, Kista (SE)

(72) Inventor: Mattias Karl Olov Edlund, Märsta (SE)

(73) Assignee: TAGMASTER AB (SE)

( * ) Notice: Subject to any disclaimer, the term of this patent is extended or adjusted under 35 U.S.C. 154(b) by 0 days.

(21) Appl. No.: 16/003,696

(22) Filed: Jun. 8, 2018

(65) Prior Publication Data

US 2019/0005813 A1 Jan. 3, 2019

(30) Foreign Application Priority Data

Jun. 28, 2017 (SE) ...................... 1750842

(51) Int. Cl.

| | |
|---|---|
| *G08G 1/042* | (2006.01) |
| *G08G 1/01* | (2006.01) |
| *H01Q 1/32* | (2006.01) |
| *G07B 15/06* | (2011.01) |
| *H04W 4/80* | (2018.01) |
| *H01Q 1/22* | (2006.01) |

(Continued)

(52) U.S. Cl.
CPC ........... *G08G 1/042* (2013.01); *G07B 15/063* (2013.01); *G08G 1/0112* (2013.01); *H01Q 1/2216* (2013.01); *H01Q 1/3225* (2013.01); *H04W 4/029* (2018.02); *H04W 4/44* (2018.02); *H04W 4/80* (2018.02)

(58) Field of Classification Search
CPC .... G07B 15/063; G08G 1/0112; G08G 1/042; H01Q 1/2216; H01Q 1/3225; H04W 4/80
See application file for complete search history.

(56) References Cited

U.S. PATENT DOCUMENTS

| | | | | |
|---|---|---|---|---|
| 5,196,846 A | * | 3/1993 | Brockelsby | ............. B61L 25/04 |
| | | | | 340/10.51 |
| 2010/0237998 A1 | | 9/2010 | Kohli | |
| 2011/0304441 A1 | | 12/2011 | Roesner | |

(Continued)

FOREIGN PATENT DOCUMENTS

| | | |
|---|---|---|
| CN | 102097013 B | 6/2011 |
| CN | 102565758 B | 7/2012 |

(Continued)

*Primary Examiner* — Sisay Yacob
(74) *Attorney, Agent, or Firm* — Tucker Ellis LLP

(57) ABSTRACT

Method and system for remotely detecting a vehicle positioned in at least one of several possible adjacent lanes, which lanes are arranged one after the other in a lateral direction, wherein reading antennas are arranged to read received electro-magnetic signals received from vehicles, at different lateral reading locations. The method involves measuring an electromagnetic signal received from the vehicle by several of said reading antennas; determining, for each of said several reading antennas, a respective received electromagnetic signal strength; determining, based upon knowledge about a respective relative geometric position and the said respective determined signal strength of each of the said several reading antennas, a geometric center of gravity for a first signal strength function, which is the received signal strength as a function of physical lateral position; and detecting the vehicle as present in a lane in which the said geometric center of gravity lies.

14 Claims, 5 Drawing Sheets

(51) Int. Cl.
*H04W 4/029* (2018.01)
*H04W 4/44* (2018.01)

(56) References Cited

U.S. PATENT DOCUMENTS

2013/0018705 A1    1/2013   Heath
2015/0056922 A1    2/2015   Povolny
2018/0173908 A1*   6/2018   Pretorius .............. H01Q 1/3225

FOREIGN PATENT DOCUMENTS

CN    102568045 B    7/2012
CN    102622783 B    8/2012
WO    2018-949117  * 11/2018  ........... G05S 13/452

* cited by examiner

METHOD AND SYSTEM FOR REMOTELY DETECTING A VEHICLE

RELATED APPLICATION DATA

This application claims the benefit of Swedish Patent Application No. 1750842-5, filed Jun. 28, 2017, the disclosure of which is incorporated herein by reference in its entirety.

The present invention relates to a method and a system for remotely detecting a vehicle, in particular a vehicle being present in one of a set of possible lanes, such as a moving vehicle on a multi-lane road or a vehicle entering through a multi-lane gate into a parking space or similar.

Conventionally, remote vehicle detection is performed using electromagnetic radiation, such as using an RFID tag in the vehicle which can be remotely read by a corresponding reading antenna fixedly mounted at the reading location. For multi-lane roads, there are for instance toll stations comprising a gantry above the road, where respective antennas are arranged to remotely detect vehicles passing beneath the gantry. For multi-lane gates, a respective reading antenna may be arranged at each respective individual entry/exit gate.

Receiver antennas typically send out a read signal, which is returned by the tag in the vehicle. The tag may be active or passive, transmitting or emitting a signal comprising vehicle-specific information.

In such multi-lane environments, it is often difficult to correctly determine in what lane a detected vehicle is positioned. This problem may at times be due to the vehicle not being correctly positioned, such as positioned near or on the border between two adjacent lanes. It may also be the case that, due to reflections and multi-path propagations of electromagnetic waves used for the remote detection, false readings are received by the reading antennas.

Such problems may result in secondary problems related to lane selection, where it is difficult to determine which lane the vehicle is positioned in.

There may also be timing problems, when the time of detection is important but difficult to ascertain. For instance, in an automatic highway toll station it may be desirable to take a photo of a passing vehicle, why it is important to determine the passage time with some accuracy.

To solve these problems, it has previously been proposed to decrease the sending power of the receiving antennas so that it is likely that only vehicles in the lane corresponding to the antenna will emit a return signal strong enough to detect. This improves the remote detection, but does not solve the above problems completely. Also, this may result in vehicles erroneously not being detected at all.

It has also been proposed to identify a minimum threshold for the return signal power, below which the return signal is disregarded.

The present invention solves the above described problems.

Hence, the invention relates to a method for remotely detecting a vehicle positioned in at least one of several possible adjacent lanes, which lanes are arranged one after the other in a lateral direction, wherein reading antennas are arranged to read received electromagnetic signals received from vehicles, at different lateral reading locations, which method is characterized in that the method comprises the steps a) during one and the same time period, measuring an electromagnetic signal received from the vehicle by several of said reading antennas; b) determining, for each of said several reading antennas, a respective received electromagnetic signal strength; c) determining, based upon knowledge about a respective relative geometric position and the said respective determined signal strength of each of the said several reading antennas, a geometric centre of gravity for a first signal strength function, which is the received signal strength as a function of physical lateral position; and d) detecting the vehicle as present in a lane in which the said geometric centre of gravity lies.

Furthermore, the invention relates to a System for remotely detecting a vehicle positioned in at least one of several possible adjacent lanes, arranged one after the other in a lateral direction, which system comprises reading antennas arranged to read received electromagnetic signals received from vehicles, at different lateral reading locations, which system is characterized in that the system is arranged to, during one and the same time period, measure an electromagnetic signal received from the vehicle by several of said reading antennas, in that the system is arranged to determine, for each of said several reading antennas, a respective received electromagnetic signal strength, in that the system is arranged to determine, based upon knowledge about a respective relative geometric position and the said respective determined signal strength of each of the said several reading antennas, a geometric centre of gravity for a first signal strength function, which is the received signal strength as a function of physical lateral position, and in that the system is arranged to detect the vehicle as present in a lane in which the said geometric centre of gravity lies.

In the following, the invention will be described in detail, with reference to exemplifying embodiments of the invention and to the enclosed drawings, wherein.

Figure 1:
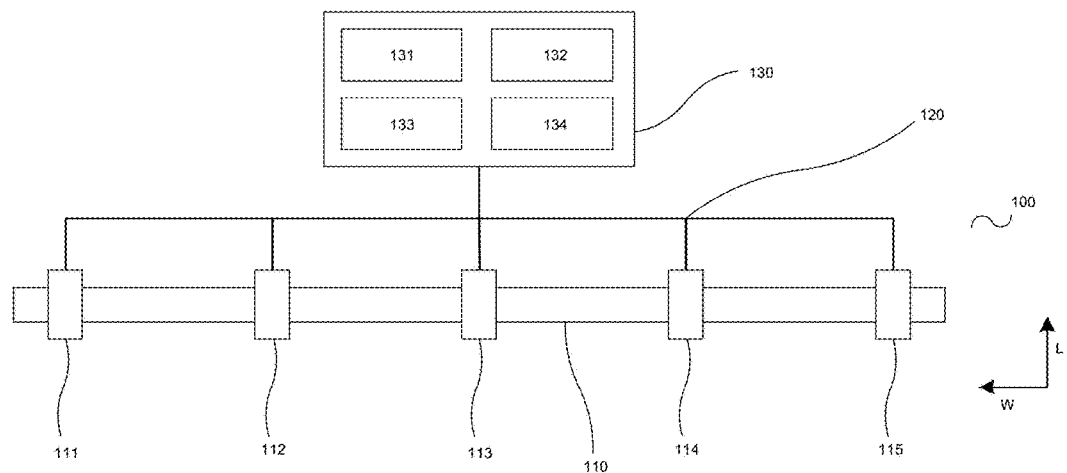
FIG. 1 is an overview of a first system according to the present invention, which system is suitable for performing a method according to the invention.

Hence, FIG. 1 illustrates a system 100 according to the present invention, for remotely detecting a vehicle C1, C2 (see FIGS. 2 and 6) according to a method according to the present invention. The vehicle is positioned in at least one of several possible adjacent lanes, which lanes are arranged one after the other in a lateral direction W.

The system 100 comprises a number of reading antennas 111, 112, 113, 114, 115, which are arranged to read received electromagnetic signals received from vehicles, and in particular from the said vehicle C1, C2. The reading antennas are arranged at different lateral W reading locations, such as equidistantly across the total lateral W distance covered by the combination of all of said lanes, such as one respective antenna centrally located above each lane.

The system 100 further comprises a control unit 130, which may be or comprise a conventional computer server, responsible for performing the analysis described herein; for presenting the results of such analysis to external systems; and to produce alerts of the below described type. Preferably, the control unit 130 is a digital control unit, performing all such tasks automatically, electronically and digitally, preferably driven by a computer software product specifically arranged to perform all method steps described herein performed by the control unit 130.

The control unit 130 preferably comprises a processing unit 131, a database or memory 132, an antenna communication means 133 and an external communication interface 134. The antenna communication means 133 is arranged to emit reading signals to the antennas 111-115, which signals are conventional per se, causing or triggering one or several targeted antennas to perform a read of received signals from vehicles. The antenna communication means 133 is also arranged to receive a read signal from each antenna 111-115 and to interpret the signal in terms of signal strength and received information content from each read vehicle.

The antennas may be any suitable radio frequency antennas, preferably RFID antennas arranged to read passive and/or active RFID transmitters arranged in passing vehicles C1, C2.

The system 100 may also comprise other parts, such as one or several visual or infrared imaging units, such as for reading the alphanumeric contents of vehicles' number plates; remotely controlled gates; and so forth, depending on the particular application.

The control unit 130 preferably communicates with said antennas 111-115 via conventional electric conduits 120, even though wireless communication may also be employed.

The antennas 111-115 may, for instance, be mounted along a rail 110, such as above the lanes such that the vehicles pass below the rail 110.

L denotes the travel direction of the vehicles.

Figure 2:
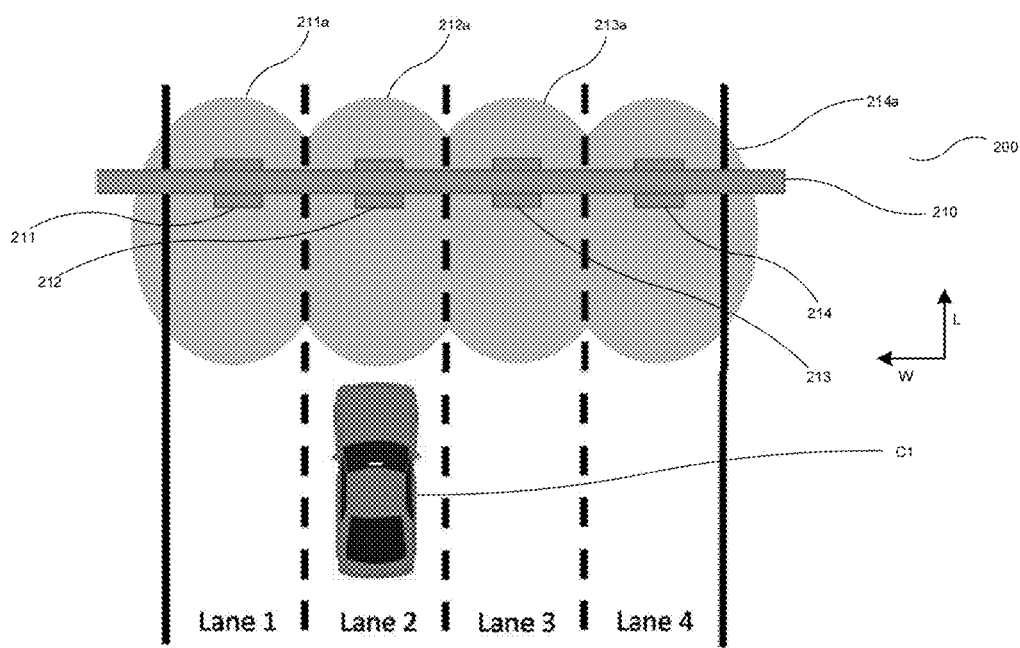
FIG. 2 is a top view of a second system according to the present invention in a first operation situation.
Figure 6:
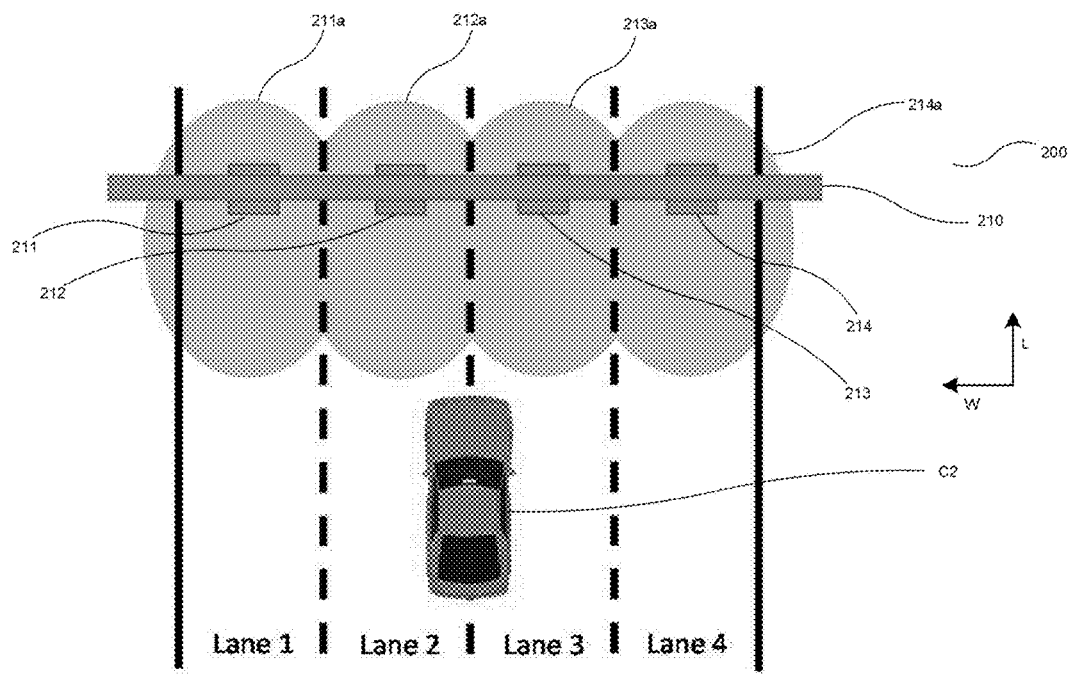
FIG. 6 is a top view of the second system according to the present invention in a second operation situation.

FIGS. 2 and 6 illustrate a corresponding system 200 according to the present invention, comprising antennas 211, 212, 213, 214 on a rail 210. A vehicle C1; C2 comprises a sending transmitter located in the windshield of the vehicle C1; C2.

Each antenna 211-214 is associated with a respective reading area 211a, 212a, 213a, 214a, within which sending transmitters of vehicles C1; C2 can be detected. The size and shape of the reading areas 211a-214a can be defined using placement of the antenna in question; selection of antenna lobe patterns; selection of a minimum signal strength for detection; and so on.

In FIG. 2, the vehicle C1 is located entirely within a particular lane, namely Lane 2. In FIG. 6, the vehicle C2 is located between two lanes, Lane 2 and Lane 3.

Figure 10:
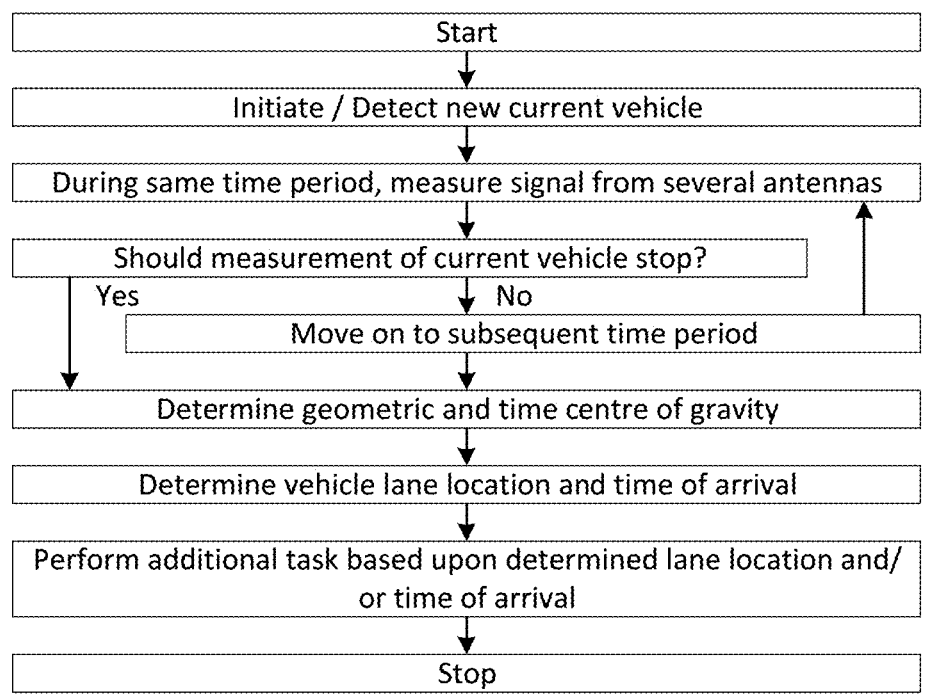
FIG. 10 is a flowchart illustrating a method according to the present invention.

FIG. 10 illustrates a method according to the present invention, which is preferably performed using a system 100, 200 according to the present invention.

In a first step, the method starts.

In a subsequent step, an electromagnetic signal is measured (read). The reading is performed by several of said reading antennas 111-115; 211-214, with respect to a signal received from the vehicle C1; C2. Furthermore, the measurement is performed during one and the same time period, which means that all involved antennas are caused to perform a respective measurement during this one single time period. It is realized that the antennas may be triggered by the control unit 130 one by one, consequently, or may be triggered simultaneously. In the former case, such a measurement "series" is performed within the said time period. Preferably, such a time period is maximally 100 ms of length, preferably maximally 50 ms of length. For the present purposes, all measurements performed by the antennas during such a time period are considered performed at the same time. Preferably, the reading is performed by all antennas 111-115; 211-214 on the rail 114, 214, preferably covering all available lanes of the road or gate system serviced by the system 100.

The road preferably comprises between 2 and 50 lanes.

In a subsequent step, for each of the said several reading antennas, a respective received electromagnetic signal strength is determined. Such a received electromagnetic signal strength is preferably specific to a certain vehicle C1, C2, in particular since several vehicles may pass in different lanes more or less at the same time. Such discrimination may preferably be performed based upon a digitally coded vehicle identifier comprised in the received electromagnetic signal. Hence, before performing the below described calculations, the control unit 130 is preferably arranged to analyse the received signals, and to sort out and only use those signals originating from one and the same vehicle.

Figure 3:
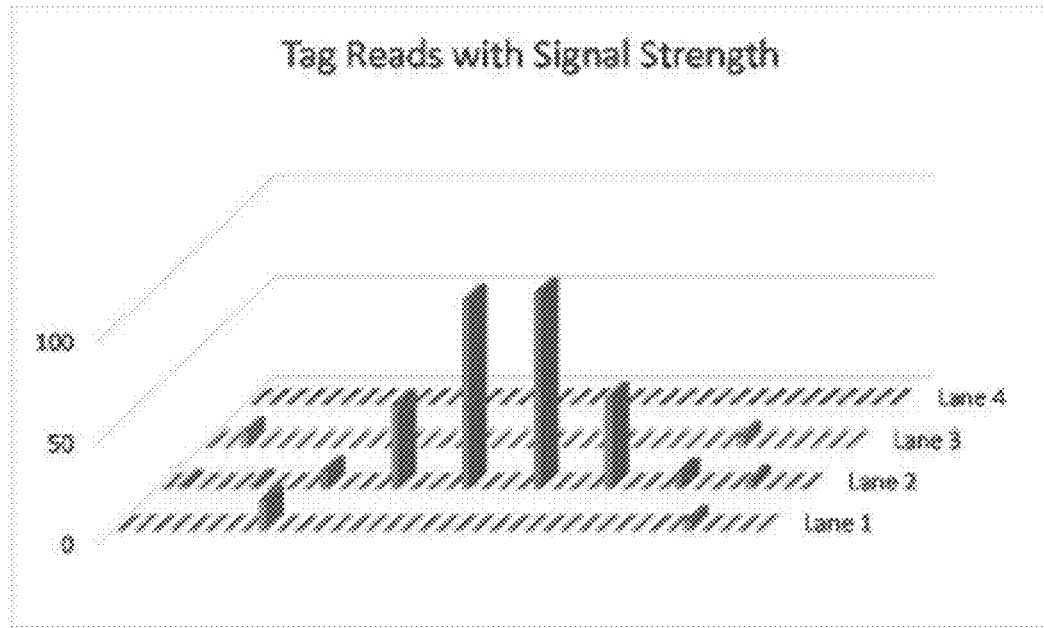
FIG. 3 is a chart showing readings of different antennas at different points in time during the first operation situation.

Such a reading for the vehicle C1 is shown in FIG. 3, in which the signal strength for each antenna (since in FIG. 2, each lane has a corresponding antenna, "Lane 1"=211; "Lane 2"=212; "Lane 3"=213; "Lane 4"=214) is depicted for a number of different time periods of the above described type. In FIG. 3, consecutive time periods are shown with increasing time to the right in the figure. Hence, in the measurement depicted in FIG. 3, several measurement series of the above described type is performed, one after the other, covering the time before the vehicle C1 approaches all the way up until the vehicle C1 has passed the rail 210.

As is apparent from FIG. 3, the readings comprise certain noise, and involve several of the antennas 211-214 even though the vehicle C1 passes in one single lane 2.

Figure 7:
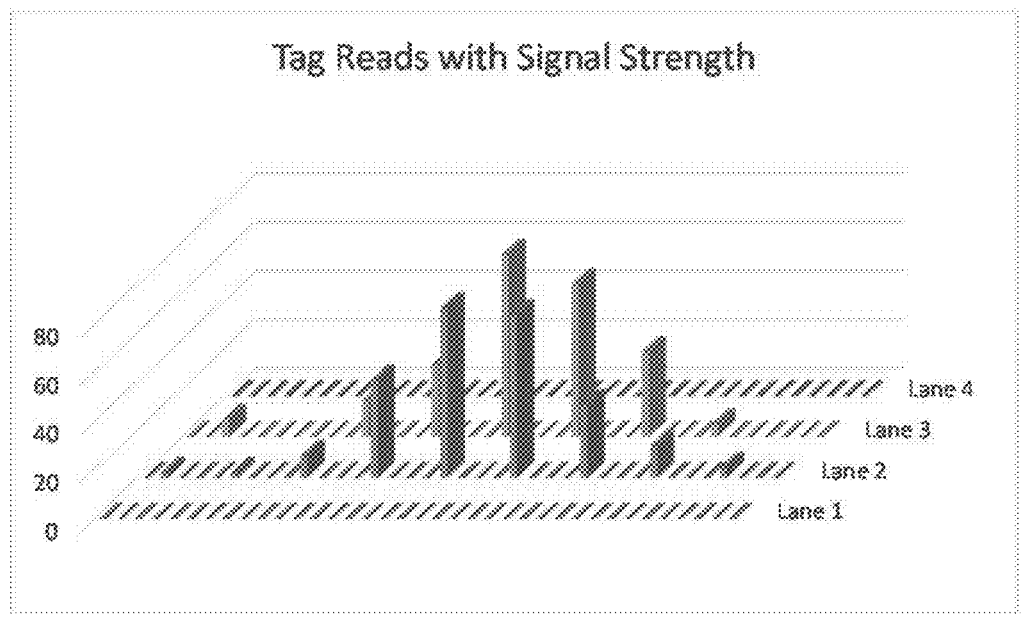
FIG. 7 is a chart showing readings of different antennas at different points in time during the second operation situation.

FIG. 7 is a corresponding chart as FIG. 3, but for vehicle C2, passing between lanes 2 and 3.

In a subsequent step in said method, it is determined, based upon a priori knowledge about a respective relative geometric position, and further upon the said respective determined signal strength, of each of the said several reading antennas 211-214, a geometric centre of gravity for a first signal strength function, which is the received signal strength as a function of physical geometric lateral position. Such a priori knowledge may be stored in the said database 132 in connection to system 100 installation.

Such signal strength function may hence be calculated for a particular one of said time periods, and may therefore be different for different such time periods during one and the same vehicle passage.

However, according to a preferred embodiment, each signal strength value of the first function is a respective total aggregated sum of read received signal strengths across said several consecutive time periods for the reading antenna in question, hence measuring the total lane-related impression provided by the vehicle while passing the antennas 211-214.

Figure 4:
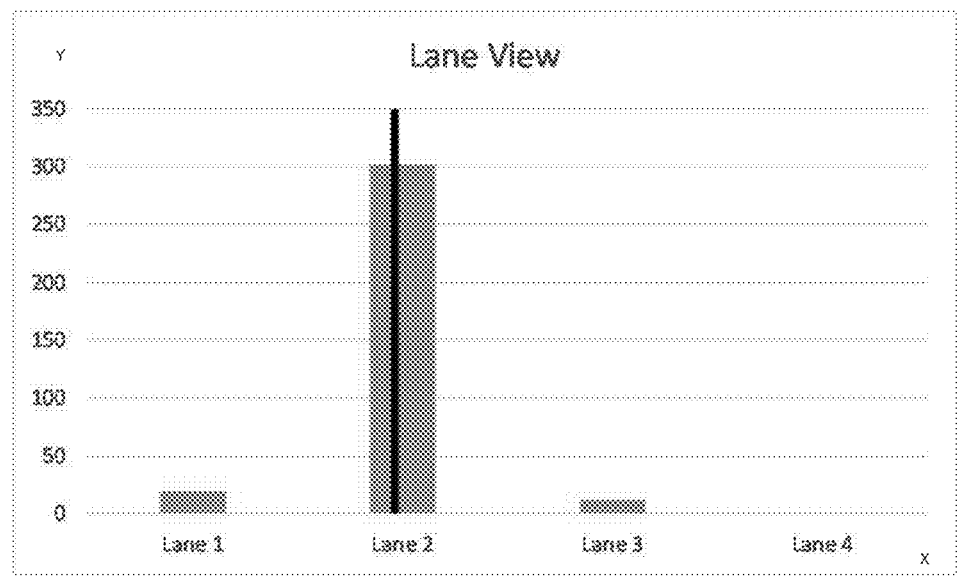
FIG. 4 is a chart showing aggregated read signals for different antennas over time during the first operation situation.

FIG. 4 illustrates the resulting first signal strength function, as a histogram with lanes on the X axis, and signal strength on the Y axis. It is also possible to perform conventional curve adaptation methods to the read signal strengths so as to obtain as the first signal strength function a smoot function rather than a simpler histogram of the type shown in FIG. 4. However, the present inventors have discovered that the simple histogram-style function directly obtainable from the read signal strengths provides sufficiently accurate results for most practical applications.

In a subsequent method step, the vehicle C1 is detected as present in a particular lane ("lane location") in which the said geometric centre of gravity lies. Alternatively, a lane location along a continuous lateral W line may be determined for the vehicle C1 in question. In the former case, the calculation is performed based upon a priori knowledge in the database 132 regarding the physical geometric lateral occupation of each of the lanes, in combination with the physical geometric mapping of the first signal strength curve to the lanes as described above, in turn based on the physical geometric lateral location of each of the antennas 211-214 used. The calculation of in which lane the centre of gravity lies within may simply be performed by calculating the geometric centre of gravity of the first signal strength curve and then determining which lane occupies the lateral W point where the centre of gravity is located.

In a subsequent step, some additional action is preferably performed by the system 100 based upon the information regarding the said detected lane location of the vehicle C1. For instance, a particular camera may be activated for reading a number plate of the vehicle C1, which camera covers the location where the vehicle C1 is detected.

Such a system and method provides a very simple way of determining where, an in particular in what lane, or between which lanes, a vehicle is located. The determination can be performed in real-time, even for vehicles passing a rail 210 at high speeds. It can also be performed with standard equipment that is often already present at for instance toll stations; passways; or garages. All that is required may be the provision of the control unit 210 with its computer software and connections.

Figure 8:
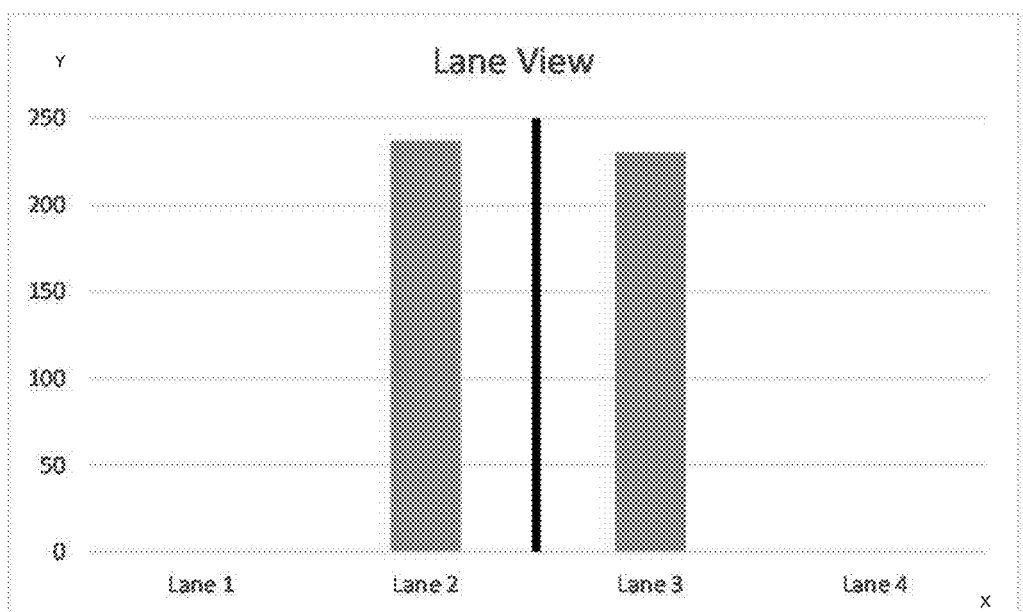
FIG. 8 is a chart showing aggregated read signals for different antennas over time during the second operation situation.

FIG. 8 corresponds to FIG. 4, but for vehicle C2 passing between lanes 2 and 3. This is an example of the preferred case in which the said lanes are lanes of a road, and wherein the vehicle C2 is moving past the said several reading antennas 211-214 on the road in question.

In particular in this case, the said geometric centre of gravity of the first signal strength function is preferably determined to lie within a predetermined geometric interval comprising a border between two neighbouring lanes, as defined in the database 132. In this case, the method comprises detecting the vehicle C2 as being located between said two neighbouring lanes, or in both of said neighbouring lanes, depending on the configuration of the system 100. This may, in turn, result in that two available cameras are simultaneously activated for imaging the number plate of the vehicle C2, or any other meaningful consequence of the detection of the vehicle C2.

As mentioned above, according to a preferred embodiment, the reading by the reading antennas 211-214 is preferably performed repeatedly, during several consecutive time periods of the said type, whereupon each signal strength value of the first function is a respective total aggregated sum of read received signal strengths across said several consecutive time periods for the reading antenna in question.

Moreover, the method preferably further comprises to determine a time centre of gravity for a second function, namely the received signal strength as a function of time, preferably the received signal strength for each of a number of consecutive time periods of the above discussed type. Then, a time of detection of the vehicle C1, C2 in question is determined as the said time centre of gravity.

In particular, it is in this case preferred that each signal strength value of the second signal strength function is a respective total aggregated sum of read received signal strengths across said several reading antennas 211-214 for the time period in question.

Figure 5:
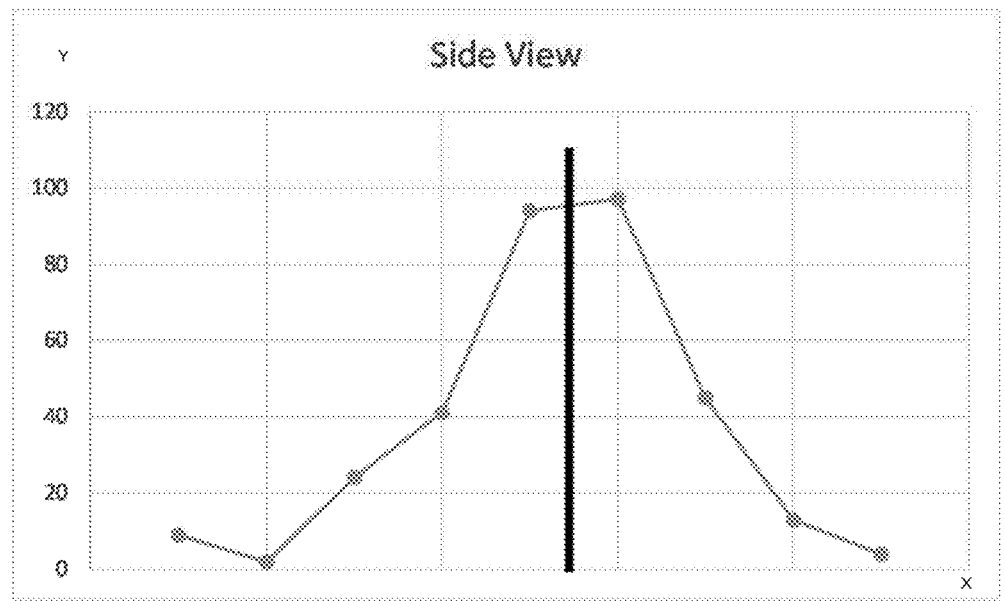
FIG. 5 is a chart showing aggregated read signals for all antennas at different points in time during the first operation situation.
Figure 9:
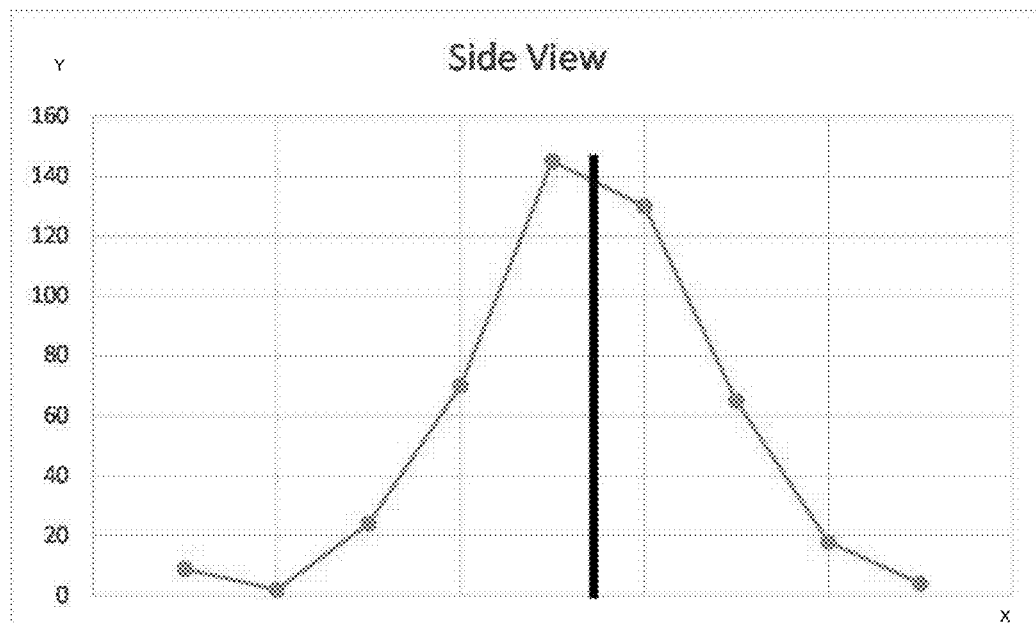
FIG. 9 is a chart showing aggregated read signals for all antennas at different points in time during the second operation situation.

FIGS. 5 and 9, respectively, illustrate the corresponding second signal strength functions for the measurement data sets illustrated in FIGS. 3 and 7, respectively. In each of FIGS. 5 and 9, the X axis represents different consecutive time periods during which each measurement was performed, while the Y axis denotes signal strength.

FIGS. 5 and 9 are labelled "Side View", since the second signal strength function can be seen as a view from the side of the road of the signal strength as a function of time as the vehicle passes.

Correspondingly, FIGS. 4 and 8 are labelled "Lane View", since they can be seen as a view as seen along the travel direction L of the signal strength as a function of lateral W distance as the vehicle passes. In all FIGS. 4, 5, 8, 9, the detected centres of gravity are indicated using a respective vertical fat line.

For both the geometric (physical lateral distance) centre of gravity and the time centre of gravity, a conventional mass centre calculation may be performed using the respective signal strength function as input, and using the X-axis values as distances in the calculation in question.

It is noted that, for both views 4/8 and 5/9, all antenna reading data is preferably used, but summed along different dimensions.

Hence, using the data read from the antennas 211-214, both the lateral W position and the time of arrival of each vehicle C1, C2 can be determined with great accuracy.

Preferably at least five consecutive time periods are used for measuring each passing vehicle C1, C2.

As illustrated in FIG. 10, the method preferably further comprises a detection initiation step, in which a particular electromagnetic signal is read by at least one of said several reading antennas 211-214 and determined to be received from a vehicle C1, C2 from which a signal has not recently been received by any of said reading antennas 211-214. Thereafter, reading of the reading antennas 211-214 is preferably performed, as described above, at least until none of said reading antennas 211-214 read an electromagnetic signal which is stronger than the corresponding electromagnetic signal read by the same reading antenna 211-214 in question during an immediately previously occurring time period. This provides for a very simple and automatic way of determining during what time period each vehicle C1, C2 is to be measured, and in particular when a measurement can stop without the time centre of gravity calculated being too volatile. In particular, it has turned out that such a stop criterion produces reliable, consistent and reproducible results regarding both said time of arrival and lane location determinations across a wide range of practical applications.

As described above, it is preferred that several, preferably all, of said several reading antennas 111-115; 211-214 are connected to one and the same central device, such as the control unit 110, which central device is arranged to cause the connected reading antennas 111-115; 211-214 in question to emit a common reading signal during the same time period but in the form of individual and separated pulses, preferably of maximally 20 ms, per antenna, while a respective detected return signal from the vehicle C1, C2 is provided to the central device from each of the said several reading antennas 111-115; 211-214.

As illustrated in FIGS. 2 and 6, each of the said several reading antennas 211-214 are preferably arranged to detect electromagnetic signals from vehicles C1, C2 in a respective reading zone 211a-214a from a set of laterally W overlapping reading zones 211a-214a. Using the present invention, such overlapping reading zones do not pose a problem. To the contrary they will in general improve measurement granularity. Preferably, reading zone 211a-214a overlap is at least 10% of the total zone area.

Moreover, the reading zones 211a-214a do not need to be located in any particular manner in relation to the lanes, as long as their individual physical lateral location, and possibly extension, is known to the control unit 210. For instance, the antennas 211-214 may preferably be positioned so that the corresponding reading zones 211a-214a are not arranged in a symmetric or systematic or regular fashion in relation to the arrangement of the lanes of the road. This may be particularly useful in cases where it is not possible to arrange a rail 210, but where the antennas 211-214 must rather be individually mounted where so is possible, such as on a crossing bridge, in a tunnel, and so forth. Using such overlapping, irregularly positioned antennas 211-214, sufficient measurement granularity may be achieved nevertheless.

According to one preferred embodiment, the above discussed lanes are lanes of a gate system, such as an entrance gate to a garage or a parking lot. In this case, the vehicle C1, C2 arrives at the gate system and is there detected by the said several reading antennas 211-214. Such detection may then be performed while the vehicle C1, C2 approaches or when at a standstill. In the former case, the time of arrival of the vehicle may be determined as described above, possibly with the addition of a maximum measurement time of, say 2 seconds or less, such as 1 second. In the latter case, a time of arrival determination may be omitted.

However, the determined lane location of the vehicle C1, C2 in question may be used to, for instance, control an automatic passage gate.

Also, it is preferred that, if the geometric centre of gravity is determined to lie within a predetermined geometric interval comprising a border between two neighbouring lanes, the method then comprises the further step of producing an alarm signal. Such an alarm signal may be communicated to an operator or to an automatic surveillance system, indicating that the driver of the vehicle C1, C2 in question requires help; or to light up an information sign informing the driver of how to proceeds.

As is clear from FIG. 10, the method according to the present invention is preferably performed in two distinct sub parts. First, the measurement is performed after detection of a new current vehicle, for a predetermined number of consecutive time periods or until the above described stop criterion is reached. Then, after all measurements have been made, the centre of gravity determinations are performed. This is possible, since the determined time of arrival may be in relation to a particular lengthwise L arrival point at which the vehicle has arrived at the determined time of arrival. This arrival point may be located several meters, in the travel direction L, before the vehicle reaches for instance an imaging zone where it number plate is read, or corresponding.

Above, preferred embodiments have been described. However, it is apparent to the skilled person that many modifications can be made to the disclosed embodiments without departing from the basic idea of the invention.

For instance, the dual centre of gravity determination described herein may be applied to other vehicle detection situations than toll gates and garage entry gates. For instance, other areas of application include traffic monitoring.

The detailed design of the system 100, 200 may of course vary, as long as the principles described above are used.

Furthermore, everything which has been said regarding the system 100 is equably appli-cable to the system 200, and vice versa. The corresponding applies between the systems 100, 200 described herein and the methods described herein.

Hence, the invention is not limited to the described embodiments, but can be varied within the scope of the enclosed claims.

What is claimed is:

1. Method for remotely detecting a vehicle positioned in at least one of several adjacent lanes, which lanes are arranged one after the other in a lateral direction, wherein reading antennas are arranged to read received electromagnetic signals received from vehicles, at different lateral reading locations, which method comprises the steps
   a) during one and the same time period, measuring an electromagnetic signal received from the vehicle by several of said reading antennas;
   b) determining, for each of said several reading antennas, a respective received electromagnetic signal strength;
   c) determining, based upon knowledge about a respective relative geometric position and the said respective determined signal strength of each of the said several reading antennas, a geometric centre of gravity for a first signal strength function, which is the received signal strength as a function of physical lateral position; and
   d) detecting the vehicle as present in a lane in which the said geometric centre of gravity lies.

2. Method according to claim 1, wherein the method further comprises to perform step a) repeatedly, during several consecutive time periods.

3. Method according to claim 2, wherein each signal strength value of the first function is a respective total aggregated sum of read received signal strengths across said several consecutive time periods for the reading antenna in question.

4. Method according to claim 2, wherein the method further comprises to determine a time centre of gravity for a second function, which is the received signal strength as a function of time; and to determine a time of detection as the said time centre of gravity.

5. Method according to claim 4, wherein each signal strength value of the second function is a respective total aggregated sum of read received signal strengths across said several reading antennas for the time period in question.

6. Method according to claim 2, wherein step a) is performed at least five times.

7. Method according to claim 6, wherein the method further comprises a detection initiation step, in which a particular electromagnetic signal is read by at least one of said several reading antennas and determined to be received from a vehicle from which a signal has not recently been received by any of said reading antennas, and wherein step a) is performed at least until none of said reading antennas read an electromagnetic signal which is stronger than the corresponding electromagnetic signal read during an immediately previously occurring time period.

8. Method according to claim 1, wherein several of said several reading antennas are connected to one and the same central device, which central device causes the connected reading antennas in question to emit a common reading signal during the same time period but in the form of individual and separated pulses of maximally 20 ms per antenna, and a respective detected return signal from the vehicle is provided to the central device from each of the said several reading antennas.

9. Method according to claim 1, wherein each of the said several reading antennas are arranged to detect electromagnetic signals from vehicles in a respective reading zone from a set of laterally overlapping reading zones.

10. Method according to claim 1, wherein the lanes are lanes of a road, and wherein the vehicle is moving past the said several reading antennas on the road.

11. Method according to claim 10, wherein, in step c), the geometric centre of gravity is determined to lie within a predetermined geometric interval comprising a border between two neighbouring lanes, and wherein the method then comprises detecting the vehicle as being located between said two neighbouring lanes or in both of said neighbouring lanes.

12. Method according to claim 1, wherein the said lanes are lanes of a gate system, and wherein the vehicle is arriving at the gate system and there detected by the said several reading antennas.

13. Method according to claim 12, wherein, in step c), the geometric centre of gravity is determined to lie within a predetermined geometric interval comprising a border between two neighbouring lanes, and wherein the method then comprises the further step of producing an alarm signal.

14. System for remotely detecting a vehicle positioned in at least one of several adjacent lanes, arranged one after the other in a lateral direction, which system comprises reading antennas arranged to read received electromagnetic signals received from vehicles, at different lateral reading locations, wherein the system is arranged to, during one and the same time period, measure an electromagnetic signal received from the vehicle by several of said reading antennas, and wherein the system is arranged to determine, for each of said several reading antennas, a respective received electromagnetic signal strength, wherein the system is arranged to determine, based upon knowledge about a respective relative geometric position and the said respective determined signal strength of each of the said several reading antennas, a geometric centre of gravity for a first signal strength function, which is the received signal strength as a function of physical lateral position, and wherein the system is arranged to detect the vehicle as present in a lane in which the said geometric centre of gravity lies.

* * * * *